(12) United States Patent
Crone

(10) Patent No.: US 6,526,233 B2
(45) Date of Patent: Feb. 25, 2003

(54) CIRCUIT FOR A PHOTOGRAPHIC FLASH

(75) Inventor: Klaus Peter Crone, Hennef (DE)

(73) Assignee: Agfa-Gevaert (BE)

(*) Notice: Subject to any disclaimer, the term of this patent is extended or adjusted under 35 U.S.C. 154(b) by 0 days.

(21) Appl. No.: 09/910,978

(22) Filed: Jul. 23, 2001

(65) Prior Publication Data

US 2002/0015591 A1 Feb. 7, 2002

(30) Foreign Application Priority Data

Jul. 25, 2000 (DE) .......................... 100 36 054

(51) Int. Cl.[7] .............................................. G03B 15/05
(52) U.S. Cl. ...................................................... 396/206
(58) Field of Search ................. 396/205, 206; 315/241 P

(56) References Cited

U.S. PATENT DOCUMENTS 5,729,774 A * 3/1998 Constable .................. 396/206

* cited by examiner

*Primary Examiner*—W. B. Perkey
(74) *Attorney, Agent, or Firm*—Connolly Bove Lodge & Hutz LLP

(57) ABSTRACT

The circuit for a photographic flash having the usual components of a switching element, transformer, rectifier, flash capacitor, trigger device and flash tube presents very good value in respect of the charging speed of the flash capacitor charging and the reliability of cutoff of said charging operation upon attainment of the desired voltage if, instead of an active component for limiting the charge of the flash capacitor, exclusively one or more suitably dimensioned passive components are integrated in the circuit.

7 Claims, 3 Drawing Sheets

CIRCUIT FOR A PHOTOGRAPHIC FLASH

Conventional flash circuits substantially comprise the following elements:

a switching element, which periodically switches the supply voltage (battery) on and off, a transformer, which transforms the periodically connected battery voltage into a high voltage suitable for a flash tube, a rectifier, which rectifies the high voltage, a flash capacitor, which is charged up to the rectified high voltage and hence stores the energy for the flash, a trigger device, which supplies an overvoltage pulse leading to ignition of the flash tube, and the flash tube, which after ignition converts the energy stored in the flash capacitor into light.

In said case, the switching element is connected to the remaining components in such a way that a self-sustaining oscillation is established.

Since both the flash capacitor and the flash tube are approved only for a specific maximum high voltage, it has to be ensured in some way that said limit is not exceeded.

A simple way is such that, by suitably designing the transformer, the high voltage is limited in such a way that overcharging of the flash capacitor is ruled out. This leads to an unnecessarily long charging time.

For shorter charging times the transformer has to be dimensioned in such a way that, in principle, considerably higher voltages than are approved might also be attained. In order nevertheless to prevent overcharging of the flash capacitor, a device is required which, on attainment of the maximum permissible voltage, interrupts the entire charging operation. Said device in all hitherto known circuits comprises an additional active element which, on attainment of the approved high voltage, interrupts the above-mentioned self-sustaining oscillation of the switching element Transistors, field-effect transistors, thyristors or similar components are used as active elements. Such active components add considerably to the cost of the circuit.

The object of the invention was to provide a circuit for a photographic flashlight, which a) uses components which are as inexpensive as possible, b) has a short charging time, c) provides a clear indication of the charge state of the battery and in which d) the maximum high voltage is not exceeded.

A further object is that a button need merely be pressed briefly to charge the flash capacitor.

In a circuit variant according to the state of the art, the customer has to close a switch in order to charge the capacitor. The flash capacitor is charged as long as the switch is closed. This has the advantage that directly after a flash the capacitor is immediately charged again and so the energy for the next flash is provided without any further action on the part of the customer. The drawback is, however, that the switch has to be opened by the customer when the flash facility is no longer required. Otherwise the battery would be unnecessarily depleted. To remind the customer to switch off, the switch may, for example, be fashioned in such a way that in the ON state it projects noticeably beyond the housing of the camera.

In a second circuit variant according to the state of the art, instead of the switch a button has to be pressed until a suitable display element indicates the state of readiness of the flash. This has the advantage of automatically interrupting the circuit to the battery after release of the button but is found bothersome by many customers.

In a third circuit variant according to the state of the art, a button merely has to be pressed for a short time to charge the flash capacitor. The charging operation is automatically stopped when either sufficient time to charge the capacitor has elapsed or the voltage across the capacitor has reached the required value. Said variant likewise has the advantage that the customer does not have to bother about interrupting the circuit to the battery. Even an automatic recharging of the capacitor after a flash may be realised electronically without forfeiting the above-described advantage.

In said third variant, the voltage-dependent cutoff is to be preferred and is achieved according to the invention in a specific embodiment.

It was surprisingly discovered that a behaviour comparable to cutoff by means of active components may be realised also by means of exclusively passive components. Here, by passive components are meant resistors, inductors, capacitors, diodes and similar components, the behaviour of which cannot be influenced by a control voltage or a control current. Such components are considerably less expensive.

In a preferred embodiment, as a switching element a conventional transistor is used, which connects the primary side of the transformer by its collector-emitter section to the battery. The rectified secondary current of the transformer is conducted via the base of the transistor, wherein the described self-sustaining oscillation is established. The frequency of said oscillation is dependent upon the actual charge state of the flash capacitor. If the base of the transistor is connected to its collector by an additional capacitor of suitable capacitance, then at a given specific frequency of the oscillation, the voltage across the base of the transistor is disturbed in such a way that the oscillation breaks off. As the oscillating frequency depends upon the actual voltage of the flash capacitor, it is possible to avoid overcharge by selection of suitably dimensioned components.

How the components are to be dimensioned depends in particular upon the inductance of the transformer windings and the properties of the used transistors. Any electronic engineer may, in view of the given teaching, develop suitable embodiments of the invention.

What is novel according to the invention is, that the interruption of the self sustaining oscillation is effected not by active elements, but by passive components, which disturb the conditions necessary to sustain the oscillation in dependence of the actual charge of the flash capacitor.

The invention is illustrated in detail in the circuits of FIGS. 1 to 3.

Figure 1:
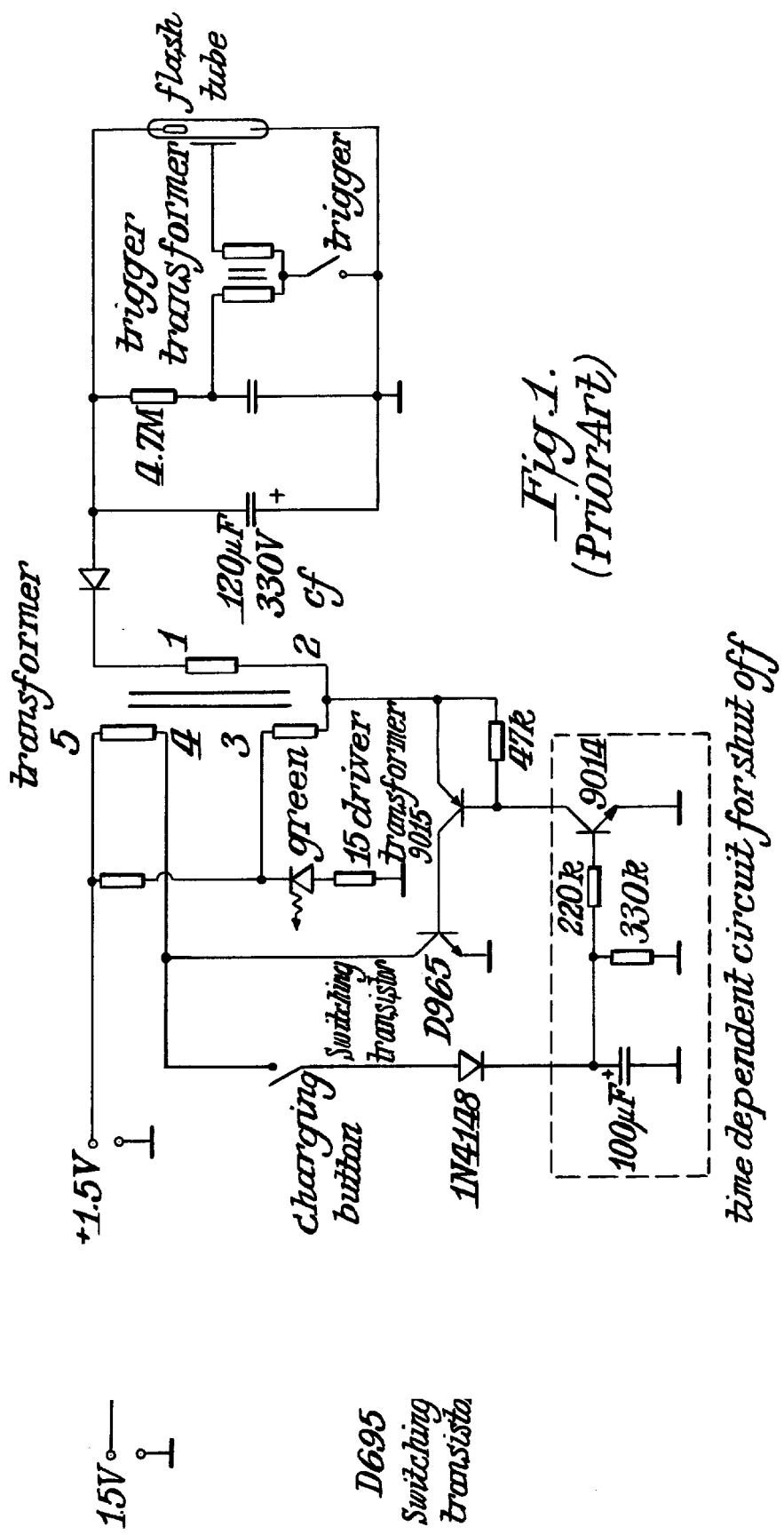
FIG. 1 shows a flashlight circuit with time-dependent cutoff of the charging operation according to the state of the art.

The time-dependent cutoff according to FIG. 1 comes about in that an auxiliary capacitor is charged very quickly by briefly pressing the start button but is discharged only slowly after release of the button. As long as the voltage of the auxiliary capacitor exceeds a specific minimum value, the electronics charge the flash capacitor. How long this lasts depends on the magnitude of the auxiliary capacitor and the discharge resistor, which together form the timing element.

The drawback of said type of cutoff is that the duration of the timing element has to be sufficient even if the battery is in poor condition or partially discharged. With a fresh battery, however, the flash capacitor is charged much more quickly so that within a period of the timing element even several flashes in succession are possible without the customer having to press the start button again. For the customer it is therefore not easy to comprehend whether or not, after one flash, it is necessary to press the start button for a photo taken immediately afterwards.

Figure 2:
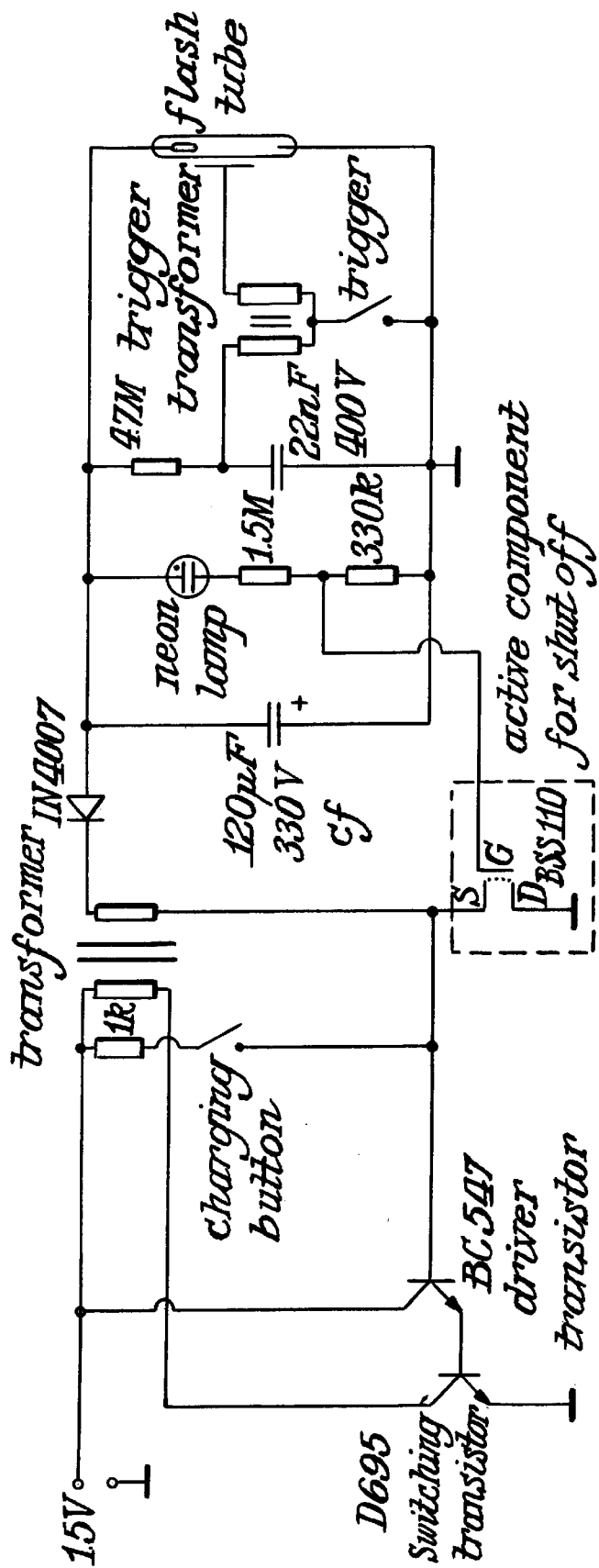
FIG. 2 shows a flashlight circuit with charge-dependent cutoff of the charging operation using a transistor (BSS 110) according to the state of the art.
Figure 3:
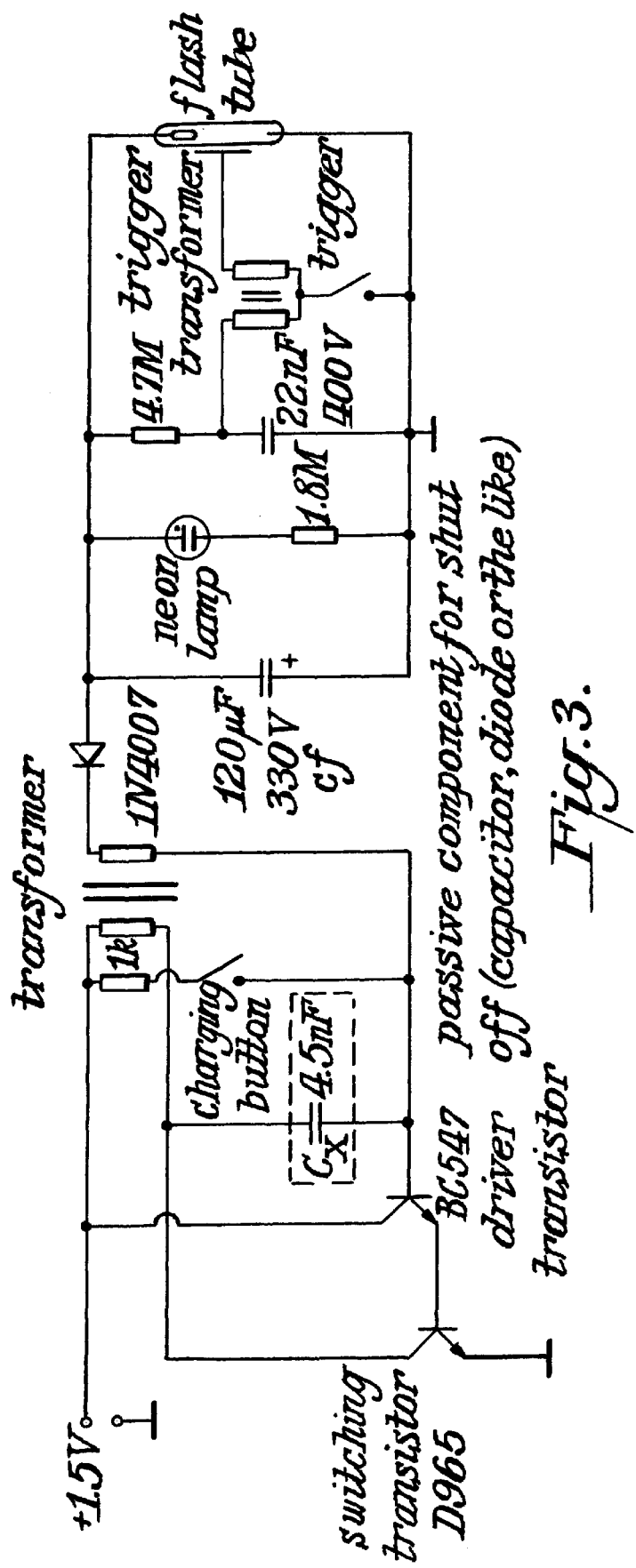
FIG. 3 shows a flashlight circuit according to the invention with charge-dependent cutoff of the charging operation using an additional capacitor, which in the present case has a capacitance of 4.5 nF.

Said drawback does not apply to variants with voltage-dependent cutoff, such as are illustrated in FIGS. 2 and 3. The circuit according to the invention shown in FIG. 3, while being otherwise of an identical design, instead of the expensive field-effect transistor BSS 110 merely comprises a comparatively very inexpensive additional capacitor.

The properties of the circuits according to FIGS. 2 and 3 regarding the charging speed and cutoff reliability of the charging operation are comparable. The circuit according to FIG. 1, on the other hand, compares very badly in terms of quality, as was previously explained.

Instead of the components D965 and BC 547 it is possible to use components which are very similar in terms of their electrical properties.

What is claimed is:

1. Circuit for a photographic flashlight comprising
   a switching element, which periodically switches the supply voltage (battery) on and off,
   a transformer, which transforms the periodically connected battery voltage into a high voltage suitable for a flash tube,
   a rectifier, which rectifies the high voltage,
   a flash capacitor, which is charged up to the rectified high voltage and hence stores the energy for the flash,
   a trigger device, which supplies an overvoltage pulse leading to ignition of the flash tube,
   and the flash tube, which after ignition converts the energy stored in the flash capacitor into light,
   characterised in that the circuit comprises, as a component limiting the high voltage of the flash capacitor, exclusively one or more passive components.

2. Circuit according to claim 1, characterised in that the passive components are resistors, inductors, capacitors or diodes.

3. Circuit according to claim 1, characterised in that the passive component breaks off the self-sustaining oscillation of the circuit upon attainment of the maximum high voltage.

4. Circuit according to claim 1, characterised in that the flash charging operation is started by briefly pressing the charging button once and cuts itself off automatically after reaching a preset voltage sufficient for the flash discharge.

5. Circuit according to claim 1, wherein at least one passive component is selected from the group consisting of an inductor, a capacitor and a diode.

6. Circuit according to claim 1, wherein at least one passive component is a capacitor.

7. Circuit according to claim 1, wherein the passive components show a frequency dependent electrical characteristic.

* * * * *